(12) United States Patent
Faynberg et al.

(10) Patent No.: US 10,951,657 B2
(45) Date of Patent: Mar. 16, 2021

(54) SYSTEMS AND METHODS FOR AUTHENTICATING PLATFORM TRUST IN A NETWORK FUNCTION VIRTUALIZATION ENVIRONMENT

(71) Applicant: CABLE TELEVISION LABORATORIES, INC, Louisville, CO (US)

(72) Inventors: Igor Faynberg, East Brunswick, NJ (US); Donald Clarke, Joplin, MO (US); Steven John Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 285 days.

(21) Appl. No.: 15/880,068

(22) Filed: Jan. 25, 2018

(65) Prior Publication Data

US 2018/0213003 A1    Jul. 26, 2018

Related U.S. Application Data

(60) Provisional application No. 62/450,311, filed on Jan. 25, 2017.

(51) Int. Cl.
| | |
|---|---|
| *H04L 29/06* | (2006.01) |
| *G06F 21/57* | (2013.01) |
| *H04L 29/08* | (2006.01) |
| *H04L 12/24* | (2006.01) |

(52) U.S. Cl.
CPC ............ *H04L 63/20* (2013.01); *G06F 21/57* (2013.01); *H04L 63/08* (2013.01); *H04L 41/069* (2013.01); *H04L 67/10* (2013.01)

(58) Field of Classification Search
CPC ................................. H04L 63/20; G06F 21/57
See application file for complete search history.

(56) References Cited

U.S. PATENT DOCUMENTS

| | | | |
|---|---|---|---|
| 8,959,195 B1 | 2/2015 | Niranjan et al. | |
| 2009/0204964 A1* | 8/2009 | Foley | G06F 21/53 718/1 |
| 2012/0023568 A1* | 1/2012 | Cha | G06F 21/335 726/10 |
| 2016/0366185 A1* | 12/2016 | Lee | H04L 63/20 |

FOREIGN PATENT DOCUMENTS

EP            2801937 A1      9/1988

OTHER PUBLICATIONS

PCT International Search Report and Written Opinion for related Application No. PCT/US2018/015289, dated Apr. 18, 2018, 14 pps.

* cited by examiner

*Primary Examiner* — William S Powers
(74) *Attorney, Agent, or Firm* — Armstrong Teasdale LLP

(57) ABSTRACT

A remote attestation system for a computer network includes an attestation operations subsystem configured to manage attestation procedures for the remote attestation system, and an attestation server pool including a plurality of attestation servers. The plurality of attestation servers is configured to perform attestation of at least one host in a data center. The system further includes an attestation state database configured to store a state of attestation of the at least one host, an attestation policy database configured to store at least one operator policy of the computer network, and an end-user service portal configured to provide access to the remote attestation system by users of the computer network.

18 Claims, 3 Drawing Sheets

US 10,951,657 B2

SYSTEMS AND METHODS FOR AUTHENTICATING PLATFORM TRUST IN A NETWORK FUNCTION VIRTUALIZATION ENVIRONMENT

CROSS REFERENCE TO RELATED APPLICATIONS

This application claims the benefit of and priority to U.S. Provisional Patent Application Ser. No. 62/450,311, filed Jan. 25, 2017, which is incorporated herein by reference in its entirety.

BACKGROUND

The field of the disclosure relates generally to management of computer networks, and more particularly, to authentication and trust establishment within such networks.

It is well known in the industry that computer networks face many difficulties confirming the authenticity of hypervisors and operating systems. The conventional networks also confront problems authenticating applications software in the subsequent execution chain thereof, before this software has been executed. One conventional solution to such problems has been standardized (e.g., by the Trusted Computing Group (TCG)), but this standardized solution has been applied to a single host, that is, the solution is pertinent only to a single host in a data center.

Conventional trust establishment models employment scheme utilize a hardware root of trust. Such hardware roots of trust aim to establish a tamper-resistant "black box" that can perform cryptographic operations, such as encryption, decryption, and hashing, using built-in cryptographic keys. Examples of such hardware roots of trust include the Trusted Platform Module TPM) and the Hardware Security Module (HSM). "Shrink-wrapped" software is then authenticated by the hardware "black box," based on a vendor signature for the software. The hardware root of trust scheme has also been used for remote attestation, with the attestation being typically performed by a third party and/or a Cloud services user.

Remote attestation solutions have also been standardized, by the European Telecommunication Standards Institute (ETSI), for the Network Function Virtualization (NFV) environment. These standards though, have not been integrated into the modern Cloud environment. Accordingly, there is a need for reliable attestation techniques that can be performed (i) for all hosts within all data centers in the Cloud, and not limited to only a single host, (ii) by the Cloud provider, as opposed to a third party (e.g., user of services provided by a particular host), and (iii) in a manner that does not rely on the actions directed by the virtual machine itself, but rather a trusted management entity under the control of the Cloud provider.

BRIEF SUMMARY

In an embodiment, a remote attestation system for a computer network includes an attestation operations subsystem configured to manage attestation procedures for the remote attestation system, and an attestation server pool including a plurality of attestation servers. The plurality of attestation servers is configured to perform attestation of at least one host in a data center. The system further includes an attestation state database configured to store a state of attestation of the at least one host, an attestation policy database configured to store at least one operator policy of the computer network, and an end-user service portal configured to provide access to the remote attestation system by users of the computer network.

In an embodiment, a computer network includes a remote attestation system including an operations subsystem, at least one server, a policy database, and a state database, a computing architecture, and at least one mapping scheme. The remote attestation system is mapped into the computing architecture according to the at least one mapping scheme.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
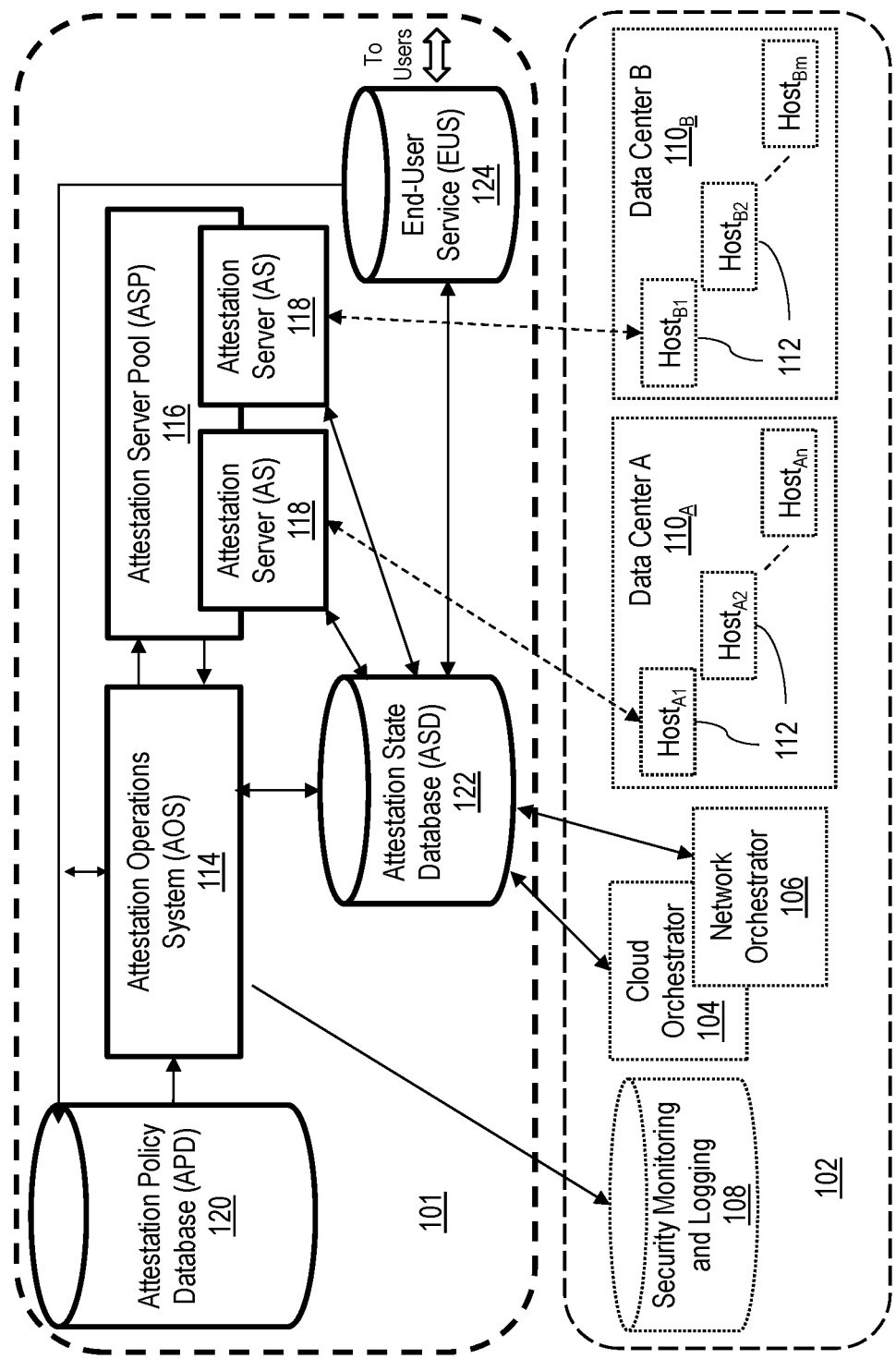
FIG. 1 is a schematic illustration of an exemplary computer network for a Cloud environment, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for authentication, attestation, and trust establishment for computer networks, and within the Cloud and NFV environments in particular. The present embodiments introduce, among other solutions, techniques for attestation in all-Cloud environment, and for Attestation-as-a-Service and related processes. The present embodiments are further advantageously applicable in the ETSI NFV Management and Orchestration (MANO) environment and architecture.

This systems and methods herein further describe the innovative incorporation of the attestation process into the Operations and Management Model of the Cloud, such that the attestation process may be performed (i) on all hosts/data centers in the Cloud, (ii) by the Cloud provider, rather than a third party, and centrally, according to its uniform policy, and (iii) in a manner that does not rely on the actions directed by the virtual machine itself, but rather a trusted management entity under the control of the Cloud provider.

In some of the embodiments provided herein, novel mechanisms and architectures may be offered by the Cloud Provider to Cloud users, to implement the attestation information as a service. These advantageous techniques eliminate the need for users to deploy and maintain attestation servers to collect the information. The present embodiments further centralize attestation, such that the Cloud resources may be more efficiently optimized and utilized in a more predictable manner, thereby resulting in significant computation savings and a decrease in network traffic.

In an exemplary embodiment, a Cloud-wide attestation policy database and/or a Cloud-wide attestation state database are integrated into the system and may be continuously updated with the results of the ongoing attestation. The databases advantageously enable (a) making placement, migration, or other life-time decisions, and (b) evaluating and manipulating service chains in a software-defined network (SDN). The systems and methods are of particular applicability in a generic Cloud or a Cloud environment, and also within the management framework of the NFV environment standardized by the ETSI NFV Industry Specification Group. The present embodiments may be deployed in all major Cloud carriers, and particularly network operators deploying standardized NFV. The systems and methods may be implemented in dedicated hardware, or as an all-software solution.

FIG. 1 is a schematic illustration of an exemplary computer network 100 for a Cloud environment. In the exemplary embodiment, network 100 includes a remote attestation system 101, and is implemented with respect to a generic Cloud architecture 102. Cloud architecture 102 includes a Cloud orchestrator 104, a network orchestrator 106, a security monitoring and logging subsystem 108, and a plurality of data centers 110 (i.e., data centers $110_A$, $110_B$, etc.). Each data center 110 includes a plurality of hosts 112 (e.g., 1-m, 1-n, etc.). Cloud orchestrator 104 is, for example, an OpenStack Heat Engine. Network orchestrator 106 is, for example, an OpenStack Neutron Engine. Subsystem 108 functions to monitor security and provide logging events.

Attestation system 101 of network 100 includes an Attestation Operations System (AOS) 114, an Attestation Server Pool (ASP) 116 including a plurality of Attestation Servers (AS) 118, an Attestation Policy Database (APD) 120, an Attestation State Database (ASD) 122, and an End User Server (EUS) 124. In operation of attestation system 101, attestation management is carried by AOS 114, which directs ASP 116 to have servers 118 perform the attestation of hosts 112 in data centers 110. In an embodiment, Cloud-wide operator policies regarding the attestation are stored in APD 120. In at least some embodiments, a current state of Cloud attestation is stored in ASD 122, which is configured to respond to queries, and also to issue event notifications. In the exemplary embodiment, EUS 124 serves as a portal for users (not shown) to access the attestation services.

In operation of network 100, a Cloud provider (not shown) of Cloud architecture 102 bootstraps the attestation operation by provisioning the policies in APD 120. Examples of such bootstrapping includes, without limitation: (1) a new host 112, attached to data center 110 <x> must have a TPM of type <y>; (2) a hypervisor booted on a host 112 <x> must be of the type <y> provided only by vendors in a list <z>; and (3) a hypervisor booted in geographical location corresponding to <x> may boot only operating systems of type <y>. In at least one example, a policy rule may be defined in the form of "<condition>: action" as in "Attestation of component <x> of virtual machine <y> fails: Remove <y> from the service chain <z>."

When a host 112 comes up, the host begins booting software according to the respective set of policies of the particular data center 110 in which host 112 is located. AOS 114 is then informed about the new presence of host 112, which triggers AOS 114 to direct ASP 116 to begin the attestation process. In the exemplary embodiment, ASP 116 is implemented as a high-availability server group, with a master server 118 being replicated therein. In an embodiment, since server software may be supplied by different vendors, ASP 116 may be configured in some cases to utilize a voting system among the individual servers 118. Upon commencement of the attestation process, ASD 122 is updated with information of the current state of all Cloud hosts 112, either continually or periodically.

According to the advantageous architecture of network 100, users of the Cloud environment are enabled to add their own policies as part of the service provided by the Cloud operator. For example, a user could specify that the code segment of particular application on any virtual machine belonging to a particular user must be unchanged, or that a particular address range must be unchanged during a given time interval. These examples are provided for illustrative purposes, and are not intended to be limiting. Conventional Cloud architectures do not enable users to specify their own attestation policies in this manner.

Network 100 further advantageously enables users to access Attestation as a service by a provider-defined Application Programming Interface (API) (e.g., Hyper-Text Transfer Protocol (HTTP)-based API such as REpresentational State Transfer (REST)). The API is accessed by the users through EUS 124, which then informs ASD 122. EUS 124 thus terminates the end-user connection, and therefore functions as a midbox. According to this advantageous architectural configuration, access to ASD 122 (and thus also to Cloud architecture 102 and network 100) is centrally controlled through EUS 124, thereby protecting the Cloud environment from potentially malevolent actions from the user (or an entity masquerading as a user).

By confining network access from a user to EUS 124, services of network 100 further advantageously support an end-user's capabilities to (i) more easily update APD 120 with the end-user's policies, (ii) interrogate the end-user specific state of ASD 122, and (iii) start and stop specific attestation processes through AOS 114. In an exemplary embodiment, EUS 124 is further configured to be responsible for both authenticating the user and ensuring that the user has proper authorization for each action requested by the respective API. According to the embodiments presented herein, the actual implementation of the attestation on behalf of the user may be performed by the virtual machine manager (e.g., OpenStack Nova), under the direction of the relevant server 118, as opposed to the conventional practice of performing attestation by the user's virtual machine.

In some embodiments, AOS 114 is further configured to trigger additional attestation procedures by monitoring ASD 112 and ASP 116. In the event that a state is encountered that is incompatible with the relevant policies (e.g., stored in APD 120), the event may be treated as a security alarm by security monitoring and logging subsystem 108. In such instances, subsystem 108 will log the event. In other instances, subsystem 108 may be configured to take additional action. In an embodiment, department 100 may be further configured to enable both Cloud orchestrator 104 and network orchestrator 106 to monitor ASD 122 as both orchestrators make their respective decisions. Decisions by Cloud orchestrator 104 may include, for example, decisions regarding placement and migration.

The capability of Cloud orchestrator 104 to monitor ASD 122 advantageously enables Cloud orchestrator 104 to more reliably enforce orchestrator policies. For example, in the case where a host 112 (e.g., for placing a VM), is to be attested to a particular security level, but the present state of host 112 reflects a lower security level, Cloud orchestrator 104 is able to disallow the placement. That is, at the time of the expected placement, Cloud orchestrator 104 checks with ASD 112 the current attestation state of host 112 and, if the monitored state contradicts a particular policy, the action (placement, in this example) is not performed. In a further example, where a particular action for a host is disallowed, the relevant event may be further locked by subsystem 108, and or trigger a security alarm.

In another example, and enforcement policy may be more stringent. That is, a particular host 112 (i.e., running a VM) is attested to a particular security level. However, when the particular attested level changes to a lower security level, network 100 may be configured such that the VM must be migrated to another host 112. Subsystem 108 may also log and/or trigger an alarm in such circumstances.

The centralized architecture of network 100 thus enables a significantly improved capability to efficiently implement a wide variety of policies, including policies that respond to events that are asynchronous with the logic of Cloud orchestrator 104, to a wide array of subscribers. In an exemplary embodiment, ASD 122 is configured to issue notifications to subscribers of such asynchronous events. Such a notification mechanism may be implemented, for example, by Cloud orchestrator 104 and/or network orchestrator 106 to notify a subscribing user of particular events, or alternatively, AOS 114 may be configured to provision such subscriptions each time a pertinent policy of APD 120 is updated. In one illustrative example, network orchestrator 106 may have a policy requiring "If a VM is not attested up to security level x, the VM may not be placed in the service chain y," or "If a security level of a VM in a service chain y falls below level x, the VM must be taken out of the service chain."

According to the advantageous centralization of the present embodiments, such attestation policies may be more easily and efficiently monitored, updated, and enforced in the Cloud environment. The attestation systems and methods of the present embodiments though, are not limited to only the Cloud environment. The novel system components described above may also be advantageously implemented with other computer networks, including without limitation, the NFV environment, as described below with respect to FIGS. 2-3.

Figure 2:
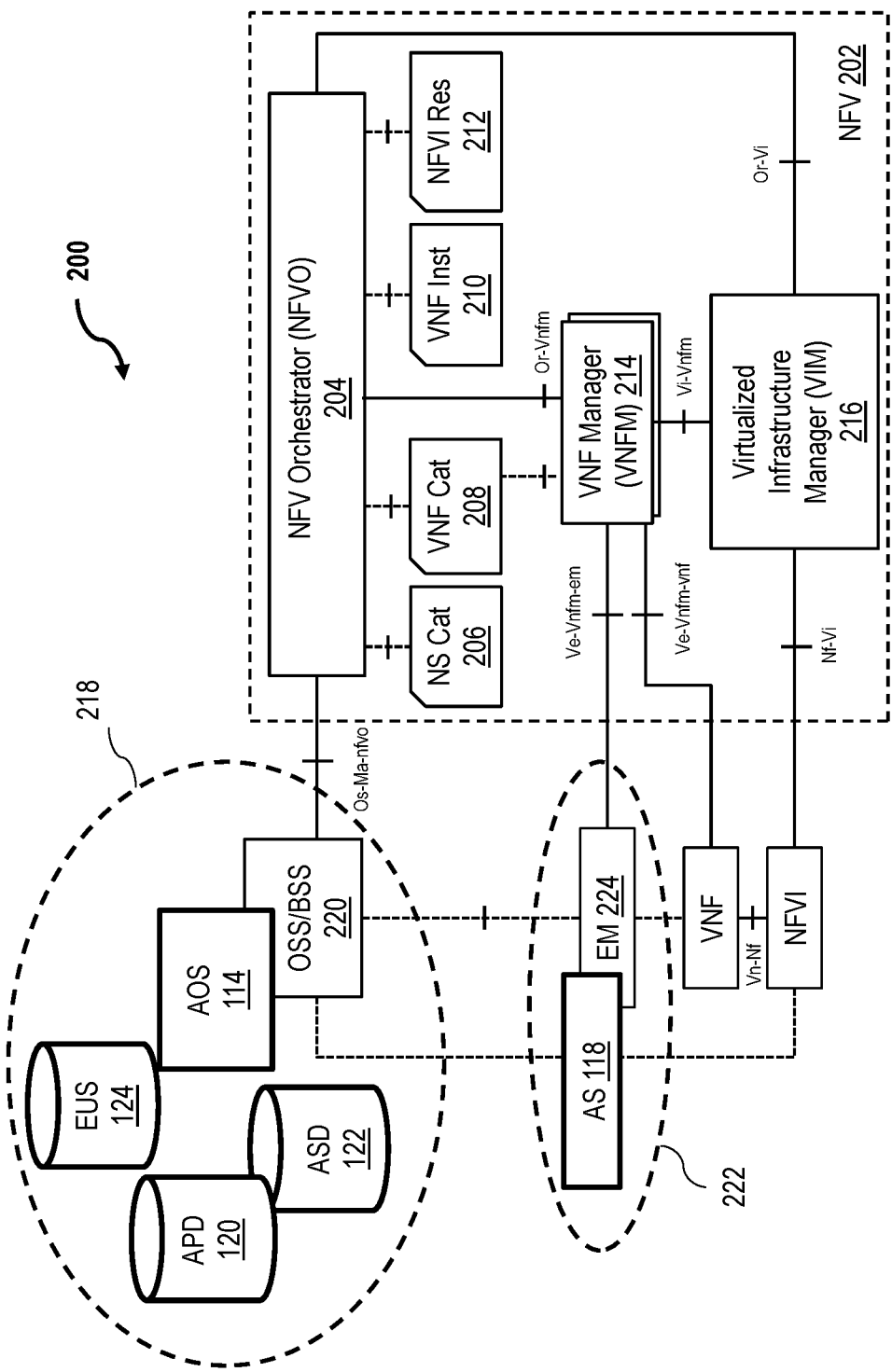
FIG. 2 is a schematic illustration of an exemplary computer network for an NFV architecture, in accordance with an embodiment.

FIG. 2 is a schematic illustration of an exemplary computer network 200 for an NFV architecture 202. NFV architecture 202 represents, for example, a system according to the ETSI NFV Management and Operations (MANO) specification, and includes an NFV orchestrator (NFVO) 204, an NS catalog 206, a virtual network functions (VNF) catalog 208, NFV instances 210, NFVI resources 212, a VNF manager (VNFM) 214, and a virtualized infrastructure manager (VIM) 216. Components of network 100, described above with respect to FIG. 1, a generally of the same individual respective structure and function, and are therefore designated within network 200 by the same reference numerals.

NFV architecture 202 is provided by way of illustration, and is not intended to be limiting. In the example depicted in FIG. 2, NFV architecture 202 illustrates the applicability and compatibility of the present systems and methods to and with existing conventional architectures. The innovative functionality of the present embodiments may also be performed with in its own original standalone environment, or may also be mapped to other computer network architectures where attestation and authentication may be performed, or which otherwise rely upon trust establishment within the computing environment.

In an exemplary embodiment, network 200 includes a first mapping 218 of AOS 114, APD 120, ASD 122, and EUS 124 into an operations support systems/business support systems (OSS/BSS) functional block 220 for NFV architecture 202. That is, all of the non-generic components described above with respect to network 100, except for servers 118, are mapped to OSS/BSS block 220. As illustrated in FIG. 2, network 200 includes a second mapping 222 of each server 118 (only one server 118 is illustrated for simplicity of explanation) of ASP 116 is into a separate element management (EM) functional block 224 for NFV architecture 202.

According to the advantageous configuration of network 200, including first mapping 218 and second mapping 222, no changes are required to the existing structural configuration of NFV architecture 202. In the exemplary embodiment, first mapping only provides access to ASD 122 through OSS/BSS block 220.

Figure 3:
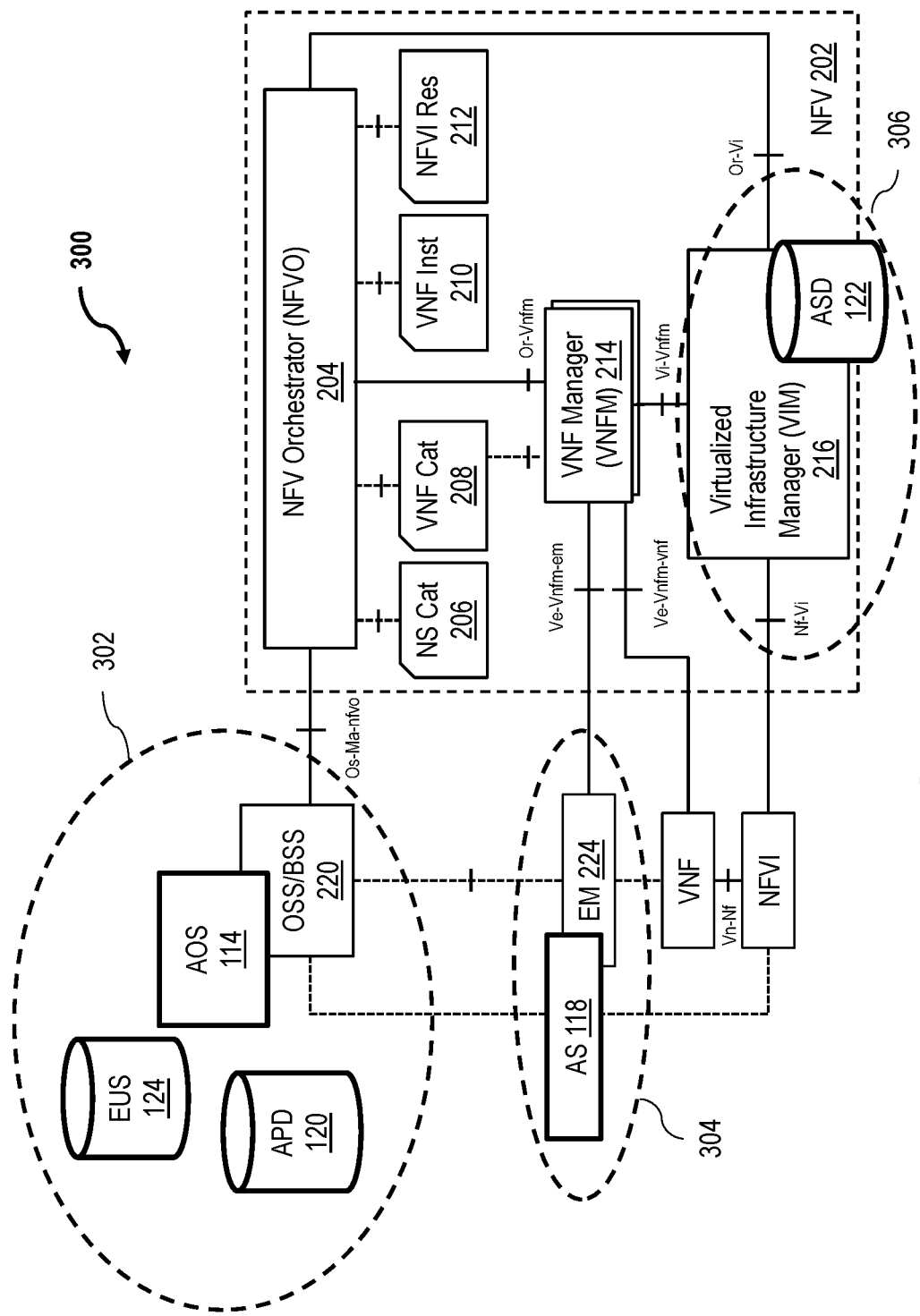
FIG. 3 is a schematic illustration of an alternative computer network for an NFV architecture, in accordance with an embodiment.

FIG. 3 is a schematic illustration of an alternative NFV computer network 300. Network 300 is similar to network 200, FIG. 2, above, and implements the same components thereof (illustrated by the same reference numerals). Network 300 differs from network 200 though, in that where network 200 implements a two-mapping technique, network 300 implements a three-mapping technique, which includes a first mapping 302, a second mapping 304, and a third mapping 306. First mapping 302 of network 300 is similar to first mapping 218 of network 200, FIG. 2, except that first mapping 302 does not map ASD 122 into OSS/BSS block 220. Instead, ASD 122 is mapped into VIM 216 of network 300 in third mapping 306. Second mapping 304 is essentially the same as second mapping 222, FIG. 2. That is, in second mapping 304, individual servers 118 are mapped to EM block 224.

According to this alternative mapping configuration, NFVO 204 and/or VNFM 214 are capable of independently accessing ASD. Nevertheless, as with network 200, even under the three-mapping technique of network 300, no changes are required to the existing structural configuration of NFV architecture 202 in order to implement this alternative virtual access configuration. The person of ordinary skill in the art, upon reading and comprehending the present specification and drawings, will therefore understand that other mapping techniques and configurations may be employed without departing from the scope of the present application.

According to the several embodiments described herein, remote attestation may be centrally implemented in a variety of different technological environments, and without requiring any structural (i.e., hardware) changes to the computer networks of such technological environments. The present embodiments therefore provide significant advantages over computer network environments requiring a hardware-based root of trust.

Exemplary embodiments of systems and methods for authentication, attestation, and trust establishment in a computer network environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A remote attestation system for a computer network, comprising:
    an attestation operations subsystem configured to manage attestation procedures for the remote attestation system;
    an attestation server pool including a plurality of attestation servers, wherein the plurality of attestation servers are configured to perform attestation of at least one host in a data center;
    an attestation state database configured to store a state of attestation of the at least one host;
    an attestation policy database configured to store at least one operator policy of the computer network; and
    an end-user service portal configured to provide a central access point to the remote attestation system by users of the computer network, wherein the users are prevented from accessing the remote attestation system except from through the end-user service portal.

2. The system of claim 1, wherein the attestation state database is further configured to respond to inquiries regarding the stored state of attestation.

3. The system of claim 2, wherein the computer network includes a Cloud-based architecture.

4. The system of claim 3, wherein the attestation state database is further configured to respond to inquiries from a Cloud orchestrator of the Cloud-based architecture received apart from the end user service portal.

5. The system of claim 3, wherein the attestation state database is further configured to respond to inquiries from a network orchestrator of the Cloud-based architecture received apart from the end user service portal.

6. The system of claim 1, wherein the attestation state database is further configured to issue at least one event notification.

7. The system of claim 6, wherein the at least one event notification indicates an incompatibility of the stored state of attestation with the at least one operator policy.

8. The system of claim 7, further comprising a security subsystem configured to log a record of the at least one event notification.

9. The system of claim 8, wherein the security subsystem is further configured to trigger an alarm upon receipt of the at least one event notification indicating the incompatibility.

10. The system of claim 1, wherein the end-user service portal includes at least one application programming interface.

11. The system of claim 2, wherein the computer network includes a network function virtualization-based architecture.

12. A computer network, comprising:
    a remote attestation system including an operations subsystem, at least one attestation server, a policy database, an end user server, and a state database;
    a computing architecture in operable communication with, but separate from, the remote attestation system, wherein the computing architecture comprises a network function virtualization (NFV)-based environment; and
    at least one mapping scheme comprising a first functional block and a second functional block different from the first functional block,
    wherein the network is configured to map, according to the at least one mapping scheme, (i) one or more of the operations subsystem, the policy database, and the end user server into the first functional block, and (ii) the at least one attestation server into the second functional block.

13. The network of claim 12, wherein the computing architecture further comprises a Cloud-based environment.

14. The network of claim 12, wherein the network is further configured to map, according to the at least one mapping scheme, the sate database into a virtualized infrastructure manager (VIM) of the NFV-based environment.

15. The network of claim 13, wherein the computing architecture comprises a plurality of data centers.

16. The network of claim 15, wherein at least one data center of the plurality of data centers includes a plurality of hosts.

17. The network of claim 12, wherein the second functional block is an element management block, wherein the NFV-based environment comprises an virtual network function manager (VNFM), and wherein the element management block is accessible from a reference point between the VNFM and the attestation server.

18. The network of claim 14, wherein the first functional block is an operations support systems/business support systems block wherein the NFV-based environment comprises a virtual network function manager (VNFM), and wherein the element management block is accessible from a reference point between the VNFM and the attestation server.

\* \* \* \* \*